United States Patent [19]

Fukunaga et al.

[11] Patent Number: 4,485,884
[45] Date of Patent: Dec. 4, 1984

[54] REAR COWLING MOUNTING STRUCTURE AND FENDER FOR MOTORCYCLE

[75] Inventors: Hirofumi Fukunaga; Kouji Shiratsuchi, both of Saitama, Japan

[73] Assignee: Honda Giken Kogyo Kabushiki Kaisha, Tokyo, Japan

[21] Appl. No.: 414,727

[22] Filed: Sep. 3, 1982

[30] Foreign Application Priority Data

Sep. 3, 1981 [JP] Japan .................... 56-130331[U]
Sep. 3, 1981 [JP] Japan .................... 56-130332[U]

[51] Int. Cl.³ .............................................. B62D 21/12
[52] U.S. Cl. .................................. 180/219; 224/32 A; 224/275; 280/152.3; 280/281 R; 296/37.1; 296/198
[58] Field of Search ............... 180/219, 218, 225, 228; 280/281 R, 289 S, 152.1, 152.2, 152.3; 296/198, 78.1, 37.1, 1 C; 224/32 A, 275

[56] References Cited

U.S. PATENT DOCUMENTS

| 3,788,532 | 1/1974 | Bish | 224/32 A X |
| 4,422,659 | 12/1983 | Nebu | 280/152.1 |
| 4,440,330 | 4/1984 | Goodman | 224/32 A X |
| 4,441,574 | 4/1984 | Kohyama et al. | 296/198 X |

FOREIGN PATENT DOCUMENTS

| 899010 | 12/1953 | Fed. Rep. of Germany | 280/281 R |
| 507938 | 1/1955 | Italy | 280/281 R |
| 534844 | 10/1955 | Italy | 280/281 R |

Primary Examiner—Joseph F. Peters, Jr.
Assistant Examiner—Mitchell J. Hill
Attorney, Agent, or Firm—Sughrue, Mion, Zinn, Macpeak & Seas

[57] ABSTRACT

A motorcycle is provided with an easily assembleable rear fender and cowling structure allowing front and rear parts of the fender to be secured together with the cowling fixed to an upper part of the front fender by locking surfaces. The construction reduces the number of parts of the assembly and permits better production efficiency, while utilizing the dead space formed as a storage compartment behind the motorcycle seat.

8 Claims, 11 Drawing Figures

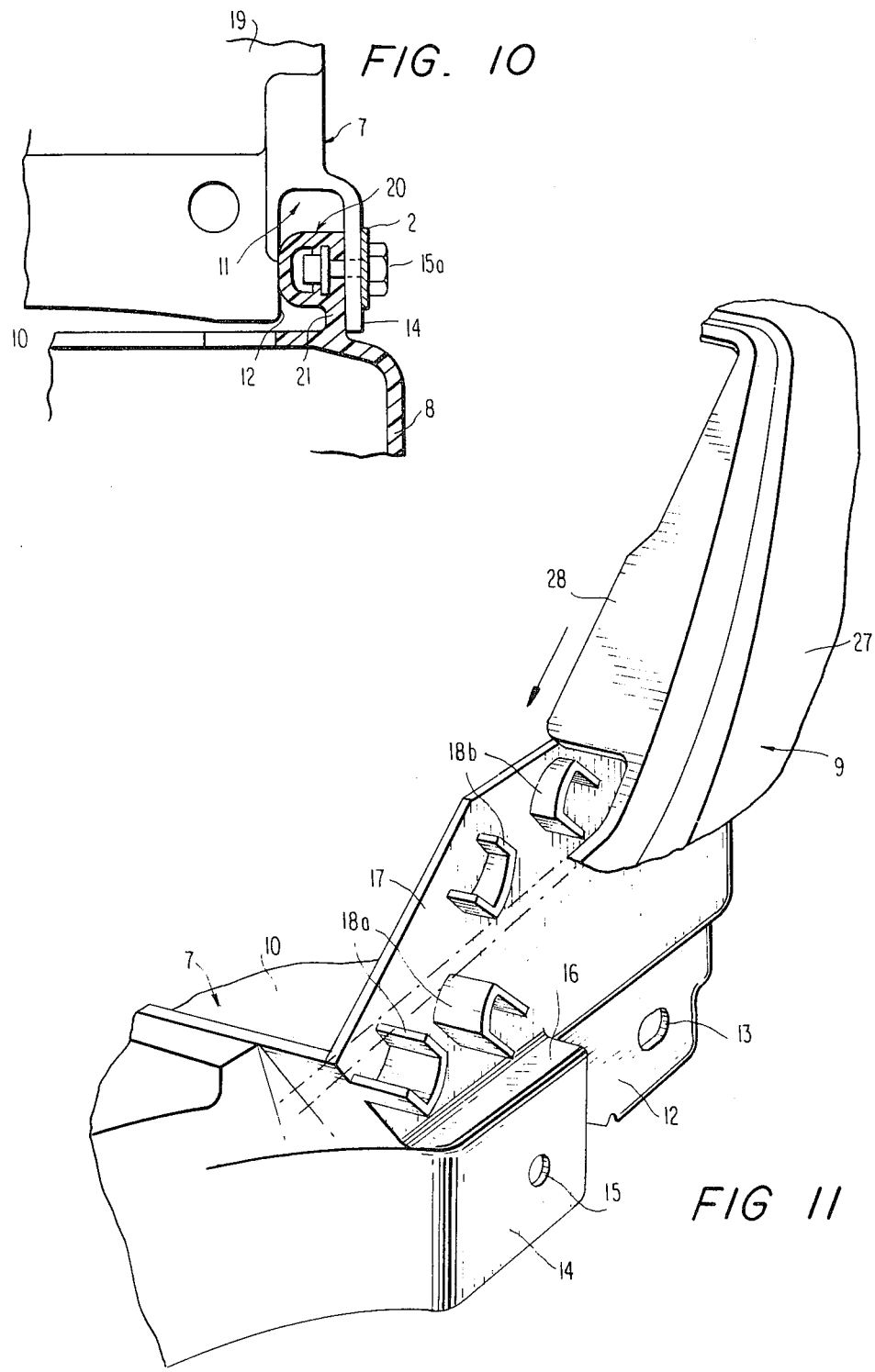

REAR COWLING MOUNTING STRUCTURE AND FENDER FOR MOTORCYCLE

BACKGROUND OF THE INVENTION

This invention relates to a mounting structure with which a rear cowling can be readily secured to a rear fender of a motorcycle, a three-wheeler or the like, and to the rear fender of a motorcycle in which members forming an article accommodating compartment are integral with a tail light mounting member. Heretofore, the rear fender, the tail light bracket and the storage compartment have been manufactured separately and secured to the body of the vehicle.

Furthermore, the seat cowling of a motorcycle or the like has been fixedly secured directly or through a mounting member to the body frame with bolts and nuts. However, these methods are disadvantageous in that the production efficiency is low, and the number of necessary components is relatively large.

SUMMARY OF THE INVENTION

In order to eliminate this dificiency, according to the invention, engaging or locking pieces integral with the side walls of a rear fender made of resin are engaged with engaging ribs integral with the inner wall of a rear cowling, to fixedly secure the rear cowling to the body of a vehicle. Also according to the invention, the side walls and the rear wall for mounting a tail light are integrally extended from the locking end portions of one of two fender pieces, and the upper part thereof is covered with a rear cowling to provide a storage compartment.

One object of the invention is to provide a rear fender for a motorcycle, in which the number of components is reduced to improve production efficiency, the weight of the vehicles body is decreased, the assembling efficiency is improved, and dead space is effectively utilized.

Another object of the invention is to provide a rear cowling mounting structure for a motorcycle or the like in which the rear cowling can be detachably mounted on the body frame with ease, and can be positively secured to the body frame, and in which the number of necessary components is relatively small.

BRIEF DESCRIPTION OF THE DRAWINGS

FIG. 10 is an explanatory diagram showing the rear fender mounted on a frame body; and FIG. 11 is an explanatory diagram outlining the engagement of the rear fender with the rear cowling.

DETAILED DESCRIPTION OF THE PREFERRED EMBODIMENTS

Figure 1:
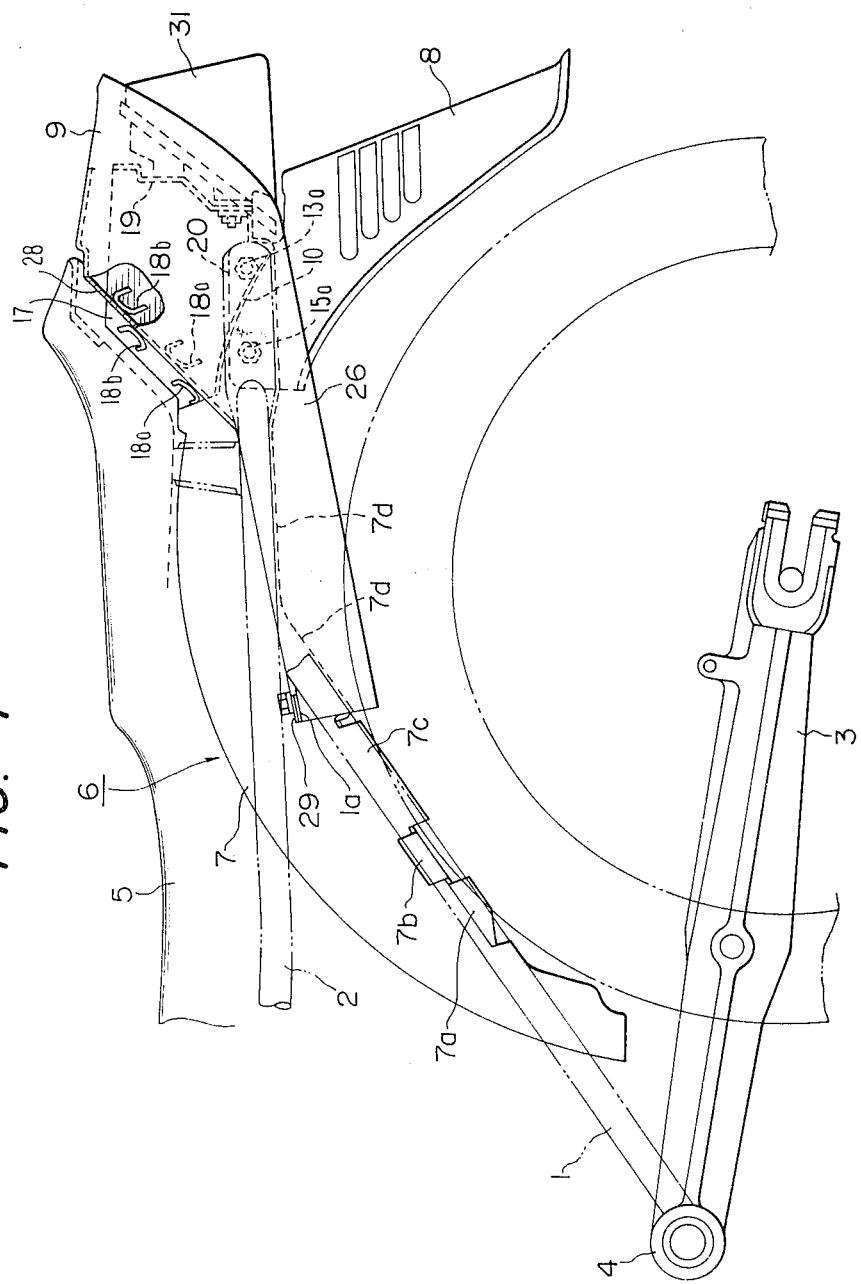
FIG. 1 is a side view outlining the rear part of a motorcycle provided with one embodiment of the invention.
Figure 2:
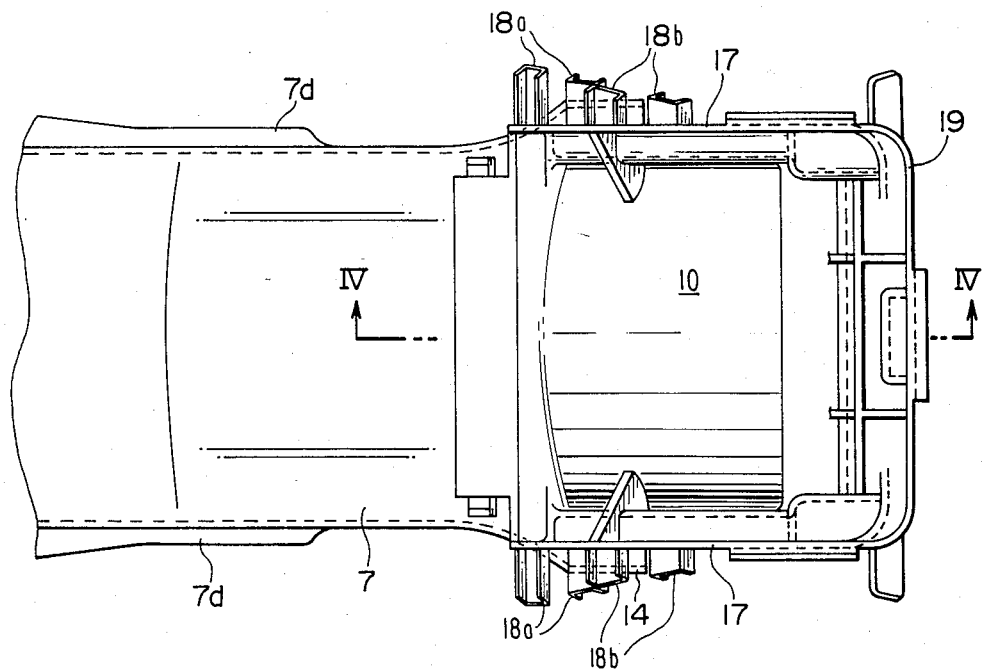
FIG. 2 is a plan view showing the essential components of a rear fender according to the invention.
Figure 3:
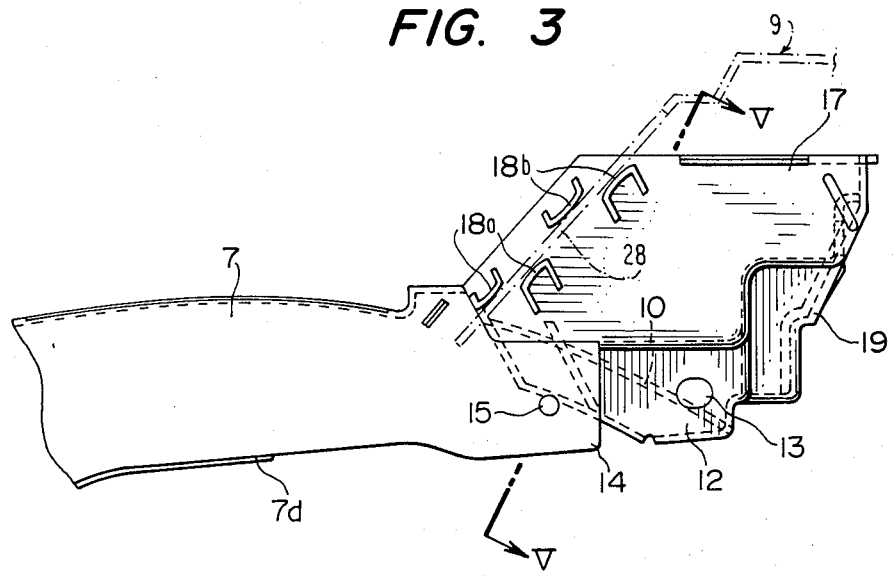
FIG. 3 is a side view of the rear fender of FIG. 2.
Figure 4:
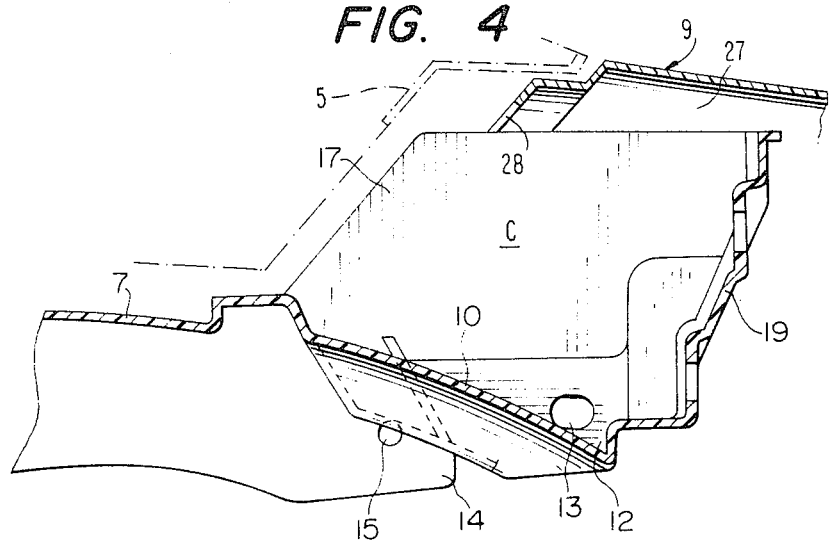
FIG. 4 is a sectional view taken along the lines IV—IV of FIG. 2.
Figure 5:
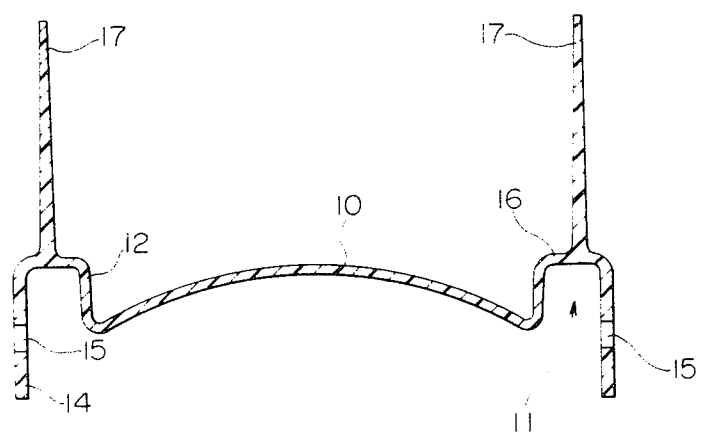
FIG. 5 is a sectional view taken along the lines V—V of FIG. 3.

FIG. 1 outlines the rear structure of a motorcycle. A rear fender 6, a rear cowling 9 and a seat 5 are mounted on a pair of back stays 1 and a pair of side rails 2 which form a frame body. A rear fork 3 is pivotally supported on a supporting mechanism 4 in a conventional manner.

The rear fender 6 (of resin) is made up of a first rear fender piece 7 and a second rear fender piece 8. The first rear fender piece 7 has a front curved part, both sides of which have locking pieces 7a, 7b, 7c and 7d which are engaged with the inside of the pair of back stays 1. Inverted-U-shaped engaging grooves 11, each being made up of an inner wall 12, an outer wall 14 and a groove bottom 16 are formed at both sides of the rear curved fender part 10. A side wall 17 extends upwardly from the upper surface of each groove bottom 16 which forms the top of the engaging groove 11, extends backwardly from the rear part of the engaging groove 11 together with parts of the inner wall 12 and the groove bottom 16, and merges with a rear wall 19. The rear wall 19 merges with the two side walls 17 on both sides and the rear curved fender portion 10 at the lower end thereof. (cf. FIG. 2 through FIG. 5)

Two pair of protruding guide claws or looking or engaging pieces 18a and 18b of channel-shape in section are provided on the front part of the outer wall surface of the pair of side walls 17 in a staggered manner. The channel-shaped bottom wall surfaces of the guide claws 18a and 18b form a locking guide path or restricted groove for the rear cowling 9 (described later in detail). The front edges of the guide claws are included in one and the same plane which is inclined at a predetermined angle forwardly from the side of the rear wall 19 with respect to the side wall 17 and which opens and is inclined at a predetermined angle downwardly from above the side wall 17. Accordingly, the front guide claws 18a project outwardly farther than the rear guide claws 18b . (cf. FIGS. 2 and 11)

The outer wall 14 and the inner wall 12 of each engaging groove 11 have respective locking holes 15 and 13 at predetermined positions in the corresponding locking end portion of each side wall 17 of the fender piece 7, and these holes are used for securing the first rear fender and the second rear fender piece 7 to the side rail 2.

Figure 6:
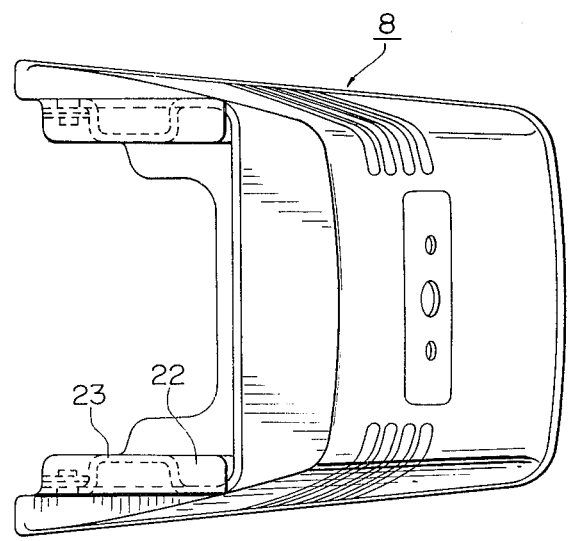
FIG. 6 is a plan view of a second rear fender according to the invention.
Figure 7:
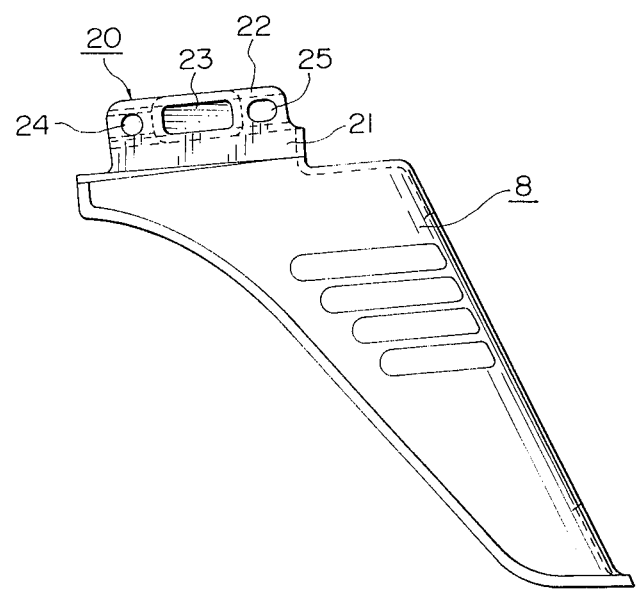
FIG. 7 is a side view of the second rear fender of FIG. 6.

On the other hand, fixing brackets 20 extend upwardly from both edges of the upper part of the second rear fender piece 8. Each fixing bracket 20 is made up of a first riser part 21 and a spacer piece 22 which is partly in the form of a block 23. The riser part has locking holes 24 and 25 which mate with the locking holes 15 and 13, respectively, in the locking end portion of the corresponding side wall 17 of fender piece 7, (cf. FIGS. 6, 7 and 10).

The rear fender piece 7 is engaged, from inside, with the pair of back stays 1 and the side rails 2 by means of the locking pieces 7a, 7b, 7c and 7d. Under the condition that the fixing brackets 20 of the second rear fender 8 piece are inserted into the engaging grooves 11 and the locking holes 15 of the outer walls 14 are aligned with the locking holes 24 while the locking holes 13 of the inner wall are aligned with the locking holes 25, the rear fender pieces 7 and 8 are secured to the inside of the pair of side rails 2 by, for example, corresponding bolts 15a and 13a (cf. FIG. 1 and FIG. 10).

Figure 8:
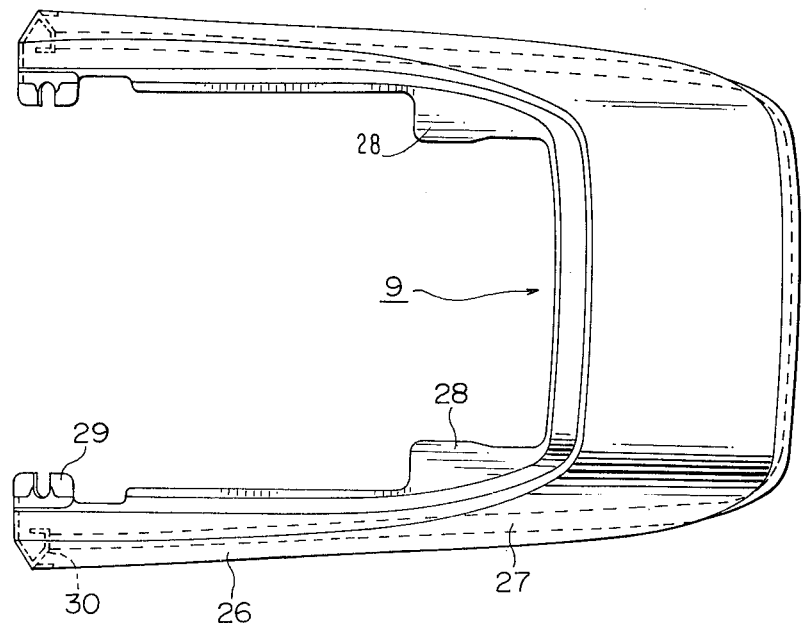
FIG. 8 is a plan view showing a rear cowling according to the invention.
Figure 9:
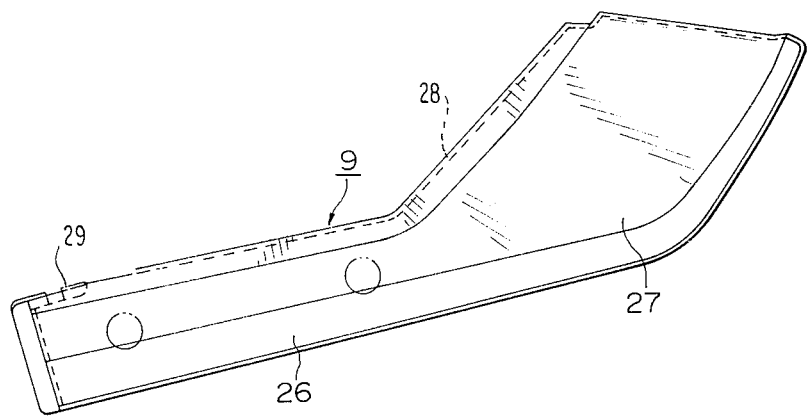
FIG. 9 is a side view of the rear cowling of FIG. 8.

The rear cowling 9 (FIGS. 8 and 9) is fundamentally U-shaped. The configuration of the rear cowling 9 is such that the part thereof at a predetermined distance from the U-shaped open ends is bent in one direction. The side view of the rear cowling 9 is in the form of a sleigh. A pair of slide pieces 28 or engaging ribs extend from the sides of the sleigh-shaped side walls 27. Fixing brackets 29 having U-shaped slots extend inwardly from the open ends.

A pair of side walls 26 of the rear cowling 9 are polygonal in section as indicated at 30.

A tail light 31 is secured to the rear wall 19 of the first rear fender piece 7 with screws.

The embodiment shown in FIGS. 1 through 11 is constructed as described above, and it is assembled as follows: The first rear fender piece 7 is engaged, from the inside, with the pair of back stays 1 and the side rails 2 with the aid of the locking pieces 7a, 7b, 7c and 7d. The fixing brackets 20 of the second rear fender piece 8 are inserted into the engaging grooves 11. The locking hole 15 of the outer wall 14 is aligned with the locking hole 24, and the locking hole 13 of the inner wall 12 is aligned with the locking hole 25. Under this condition, the first rear fender piece 7 is fixedly secured to the inside of each side rail 2 with bolts and nuts as previously described (cf. FIGS. 1 and 10). The rear cowling 9 can be positively positioned according to the following method: With the closing type (or detachable type) seat 5 opened, the rear cowling 9 is fitted from above in such a manner that it holds the two side walls 17 of the first rear fender piece 7. Then, the slide piece 28 is engaged with the guide claws 18a and 18b which protrude in a staggered manner on the side wall 17. The pair of fixing brackets 29 are secured with screws to brackets la which protrude from the back stays 1 at predetermined positions. Thus, the rear cowling 9 is positively positioned.

Thereafter, the seat 5 is fixedly set on the side rails 2, and the assembling operation is completed.

In the above-described embodiment, the slide pieces 28 or engaging ribs of the rear cowling 9 are fixedly secured between the guide claws or engaging or locking pieces 18a and 18b which protrude from the two side walls 17 of the first rear fender piece 7. Therefore, the rear cowling can be readily mounted and can be positioned with high accuracy, which remarkably improves production efficiency.

Furthermore, in the above-described embodiment, the guide claws 18a and 18b for mounting the rear cowling are integrally molded with the first rear fender piece 7, and therefore the number of components is reduced by as much, which results in high productivity. Also, the rear wall 19 for mounting the tail light 31 is also molded integrally with the first rear fender piece 7. Therefore, the mounting accuracy of the tail light 31 is improved. The positional relation between the tail light and the rear cowling 9 or the second rear fender 8 is accurate, with the result that the external appearance is improved, and the weight of the vehicle body is decreased.

As the tail light 31 can be secured to the rear fender 7 before the latter piece 7 is secured to the vehicle body, productivity is improved.

The dead space which is formed by the two side walls 17 of the first rear fender piece 7, the rear curved fender part 10 and the rear cowling 9 is utilized as a compartment c for accommodating articles, such as the storage of tools or the like, and is accessed by lifting the seat.

In the above-described embodiment, the two side walls 17 having the guide claws or engaging pieces 18a and 18b and the rear wall 19, for mounting the tail light, are provided on the first rear fender piece 7; however, substantially the same effect can be obtained by providing those components on the second rear fender piece 8.

As is apparent from the above description, in the rear fender of a motorcycle which is made up of two fender pieces, the pair of side walls and the rear wall for mounting the tail light are extended integrally from the locking end portions of one of the two fender pieces, and a storage compartment is formed by shielding the upper part with the rear cowling. Accordingly, the number of components is relatively small, production efficiency is improved, the weight of the vehicle body is decreased, and the dead space is effectively utilized. According to the invention, in a motorcycle or the like, the locking or engaging pieces (guide claw 18a and 18b) integral with the side walls of the rear fender made of resin are engaged with the engaging ribs (slide pieces 28) integral with the inner wall of the rear cowling, so that the rear cowling is fixedly secured to the vehicle body. Therefore, the rear cowling can be readily mounted and positioned with high accuracy, which improves production efficiency.

As the rear cowling mounting locking pieces (namely, the guide claws in the embodiment) and the rear fender are molded as one unit, the number of necessary components is reduced, which again contributes to an improvement in productivity.

What is claimed is:

1. A rear cowling mounting structure for the body of a motorcycle or the like comprising; a rear fender having side walls, engaging pieces integral with said side walls of said rear fender, a rear cowling having an inner wall, and engaging ribs integral with the inner wall of said rear cowling, said engaging pieces being engaged with said ribs to fixedly secure said rear cowling to the body of said motorcycle.

2. A rear fender for a motorcycle, comprising; first and second fender pieces, one of said fender pieces having locking end portions, a pair of side walls and a rear wall, for mounting a tail light, and integrally extended from said locking end portions of said one of said fender pieces, an upper part of said one of said fender pieces being covered with a rear cowling to provide an article accomodating compartment.

3. An apparatus as claimed in claim 1, said rear fender comprising first and second fender pieces, said first fender piece being a forward fender piece and including said engaging pieces.

4. An apparatus as claimed in claim 3, said rear cowling forming, with said forward fender piece, an article accommodating compartment.

5. An apparatus as claimed in claim 1, said integral engaging pieces together defining restricted grooves for the insertion of said engaging ribs.

6. An apparatus as claimed in claim 1, said cowling further including fixing brackets adapted to be fixed with fastener means to said body of said motorcycle.

7. An apparatus as claimed in claim 2, said second fender piece being secured to a portion of said first fender piece and extending below said rear wall of said first fender piece.

8. An apparatus as claimed in claim 7, said locking end portions being provided on said first fender piece and including means for mounting said cowling.

* * * * *